(12) United States Patent
Nakakawaji et al.

(10) Patent No.: US 6,917,495 B2
(45) Date of Patent: Jul. 12, 2005

(54) MAGNETIC DISK DRIVE

(75) Inventors: Takayuki Nakakawaji, Kitaibaraki (JP); Mina Ishida, Hitachi (JP); Yutaka Ito, Takahagi (JP); Hiroyuki Matsumoto, Chigasaki (JP); Hiroshi Tani, Ninomiya (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/689,599

(22) Filed: Oct. 22, 2003

(65) Prior Publication Data

US 2004/0080864 A1 Apr. 29, 2004

Related U.S. Application Data

(63) Continuation of application No. 10/347,912, filed on Jan. 22, 2003, and a continuation of application No. 09/897,401, filed on Jul. 3, 2001, now Pat. No. 6,665,147, said application No. 10/347,912, is a continuation-in-part of application No. 09/897,401.

(30) Foreign Application Priority Data

Jul. 5, 2000 (JP) ........................ 2000-208228

(51) Int. Cl.[7] .................................... G11B 5/60
(52) U.S. Cl. .................................... 360/234.1
(58) Field of Search ...................... 360/234.1

(56) References Cited

U.S. PATENT DOCUMENTS 5,193,046 A * 3/1993 Lemke et al. ............ 360/97.02
5,200,867 A * 4/1993 Albrecht et al. ......... 360/234.1
6,190,749 B1 * 2/2001 Stirniman et al. ......... 428/64.1

FOREIGN PATENT DOCUMENTS

| JP | 59-218668 | 12/1984 |
|----|-----------|---------|
| JP | 60-239921 | 11/1985 |
| JP | 6-295579 | 10/1994 |
| JP | 8-45239 | 9/1996 |
| JP | 8-45238 | 10/1996 |
| JP | 2796852 | 9/1998 |
| JP | 10-312660 | 11/1998 |

* cited by examiner

Primary Examiner—A. J. Heinz
(74) Attorney, Agent, or Firm—Antonelli, Terry, Stout & Kraus, LLP

(57) ABSTRACT

A magnetic disk drive having a magnetic disk, a spindle motor for rotating the magnetic disk, a magnetic head slider for recording or reproducing data onto or from the magnetic disk and a housing. A control circuit system is provided for controlling the head slider so that the head slider is positioned on the magnetic disk plane when the magnetic disk is rotating, and the head slider is saved to outside the magnetic disk plane when rotation of the magnetic disk is stopped. A lubricant supplier is provided for supplying lubricant to the surface of the magnetic disk. The lubricant supplier contains at least a perfluoropolyether compound having any one of an alcohol group, a cyclic ether group, and an alkyl-ester group at its terminal position as a lubricant, and the lubricant contains the perfluoropolyether compound having a molecular weight sufficient to enable lubrication and no greater than 4000.

3 Claims, 9 Drawing Sheets

| No. | AVERAGE MOLECULAR WEIGTH | RATIO OF SUBSTITUTION | m/n |
|---|---|---|---|
| 1 | — | — | — |
| 2 | 7100 | 91 | 1.10 |
| 3 | 4640 | 91 | 1.14 |
| 4 | 3060 | 93 | 1.16 |
| 5 | 2180 | 96 | 1.18 |
| 6 | 1690 | 98 | 1.20 |
| 7 | 1340 | 99 | 1.21 |
| 8 | 1060 | 100 | 1.19 |

MAGNETIC DISK DRIVE

CROSS REFERENCE TO RELATED APPLICATION

This is a continuation of U.S. application Ser. No. 09/897,401, filed Jul. 3, 2001 now U.S. Pat. No. 6,665,147, the subject matter of which is incorporated by reference herein and copending with U.S. application Ser. No. 10/347,912, filed Jan. 22, 2003, which is a continuation-in-part of U.S. application Ser. No. 09/897,401, filed Jul. 3, 2001.

BACKGROUND OF THE INVENTION

The present invention relates to a magnetic disk drive.

Thickness of a lubricant film applied onto a surface of magnetic disk is decreased on account of a centrifugal force and a shear force generated by rotation of the magnetic disk, and splashing by temperature rise in the magnetic disk drive. In order to maintain sliding durability between a magnetic disk and a magnetic head slider, a lubricant is supplied onto surface of the disk, or the lubricant is applied onto the surface of the disk. Various methods for supplying lubricants onto the surface of disk in a magnetic disk drive are disclosed in JPA-59-218668 (1984), JP-A-60-239921 (1985), JP-A-8-45238 (1996), JP-A-10-312660 (1998), JP-A-8-45239 (1996), JP-A-6-295579 (1994), Japanese Patent No. 2796852, and others.

In accordance with JP-A-59-218668 (1984), a lubricant is supplied onto the surface of magnetic disk from a venting hole at the center of the hub by generating the lubricant vapor from the lubricant impregnated member provided at the bottom of the device by heated air flow generated with rotation of the magnetic disk. In accordance with JP-A-60-239921 (1985), a lubricant film is formed on the surface of magnetic disk by depositing from myristic acid vapor, which is vaporized from a myristic acid impregnated member by blowing hot air thereon,. In accordance with JP-A-8-45238 (1996), a lubricant film made of a liquid lubricant is formed on an arm or a suspension, and the lubricant is supplied onto the surface of magnetic disk by an air flow accompanied with rotation of the magnetic disk. In accordance with JP-A-10-312660 (1998), JP-A-8-45239 (1996), and Japanese Patent No. 27906852, a liquid lubricant is supplied onto the surface of magnetic disk by placing a wick material, wherein the liquid lubricant having a low viscosity is impregnated, in the vicinity of the disk. In accordance with JP-A-6-295579 (1994), a lubricant is supplied from a reservoir provided with a heating element.

Thickness of lubricant film on the disk maintains a definite value under a condition that an amount of the lubricant reduced by scraping-off and splashing is balanced with an amount of the lubricant supplied by heat and air flow, and sliding durability between the magnetic disk and the magnetic head slider is ensured. However, if the balance is lost, the lubricating performance is lowered by continuous decrease of the lubricant film thickness, or reversely, too much increase of the lubricant film thickness. Furthermore, another cause for decreasing the sliding performance is contamination of the head slider with various contaminants which are brought into the device from both exterior and interior of the device.

In order to solve the problem mentioned above, by supplying a lubricant, physical properties of the lubricant such as molecular structure and molecular weight, and the amount of the lubricant held in the magnetic disk drive must be studied in detail before practical use of the lubricant. In accordance with the prior art mentioned above, optimization of supplying amount of the lubricant, physical properties of the lubricant such as molecular structure and molecular weight, and the amount of the lubricant held in the magnetic disk drive are not practically studied nor disclosed. Accordingly, stable supply of the lubricant by heat or air flow is impossible.

Furthermore, operation systems and structures of the magnetic disk drive must be considered. For instance, in accordance with a CSS (Contact Start Stop) system disclosed in JP-A-59-218668 (1984), a strong adsorption (stiction) is generated between the head slider and the magnetic disk, if the lubricant film thickness is increased, and a trouble such as difficulty in starting up of the magnetic disk and the like are generated. Therefore, a L/UL (Load/Unload) system can be deemed as desirable for supplying a lubricant.

SUMMARY OF THE INVENTION

One of the objects of the present invention is to provide a magnetic disk drive having a small decrease in thickness of lubricant film on the magnetic disk surface, and a superior reliability in sliding performance between the magnetic head and the magnetic disk surface.

In order to decrease reduction of lubricant film thickness on the magnetic disk surface, the inventors of the present invention found an optimum molecular weight and molecular structures of lubricants which are supplied from a lubricant holding member to the magnetic disk surface utilizing heat in the magnetic disk drive and an air flow caused by rotation of the magnetic disk. Furthermore, the lubricant holding members were studied and optimized.

When the lubricant is supplied utilizing heat and/or air flow, the amount of supplied lubricant varies significantly depending on the material which holds the lubricant, and direction, strength, temperature, and the like of air flow at the installed location of the lubricant holding member. Necessary amount of the lubricant varies depending on the volume of the magnetic disk drive, a number of rotation of the disk, and the number of magnetic disks mounted on the magnetic disk drive. In order to optimize the supplying amount of the lubricant, the molecular weight and the molecular structure of the lubricant must be specified, because physical properties of the lubricant varies depending on the molecular weight and the molecular structure.

Perfluoropolyether, one of the lubricants for the magnetic disk, is less volatile in comparison with hydrocarbon group lubricants such as mineral oil and the like which are used for general industrial machines. In accordance with increasing molecular weight, the lubricant becomes less volatile. Accordingly, in order to supply perfluoropolyether to surface of the disk by heat and air flow, readily volatile relatively low molecular weight components are necessary.

Furthermore, the structure of terminal group of the lubricant must be specified in order to optimize the supplying amount of the lubricant, because an adsorbing force of the lubricant holding member and mutual interactions between the lubricant molecules themselves vary significantly depending on the structure of the terminal group of perfluoropolyether molecules. The adsorbing force between the lubricant holding member and the lubricant influences on readiness of supplying the lubricant, and the mutual interactions between the lubricant molecules themselves influence on recovery of the lubricant film on surface of the magnetic disk.

Lubricants, which can reduces as possible to adhere gases brought into the magnetic disk drive, gases, wear particle, and dusts generated in the device onto sliding portions of the slider and head element portions, are desirably selected.

Feature of the present invention is that: a lubricant supplying means for supplying a lubricant to surface of the magnetic disk from a portion other than the surface of the disk is provided in the magnetic disk drive; the lubricant supplied by the lubricant supplying means includes at least one of the components expressed by the structural formulas 1–5; and the component is perfluoropolyether having a molecular weight equals to or smaller than 4000. Furthermore, desirably, the components having a molecular weight of at least 1000 and equals to or smaller than 4000 are contained at least 40%.

(Structural formula 1)

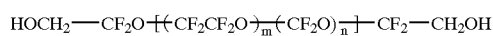

(Structural formula 2)

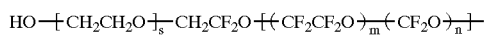

(Structural formula 3)

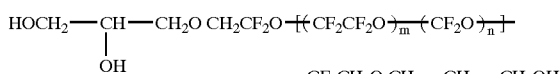

(Structural formula 4)

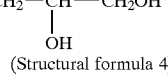

(Structural formula 5)

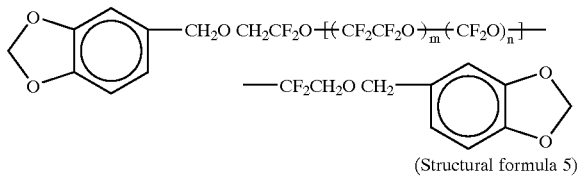

$CH_3$—OOC—$CF_2O$—$(CF_2CF_2O)_m$—$(CF_2O)_n$—$CF_2$—COO—$CH_3$ (where, n, m, s are positive integer).

The lubricant supplying means can be a suspension or an arm applied with the lubricant.

The lubricant supplying means can be a lubricant holding means which holds the lubricant. In this case, the lubricant desirably contains perfluoropolyether having a structure expressed by any one of the structural formulas 1–5. The lubricant holding means is desirably made of a material, which can hold the lubricant without separating as the lubricant drops, such as filter, wick materials, and the like.

The lubricant holding means is desirably a filter impregnated with perfluoropolyether having a structure expressed by any one of the structural formulas 1–5. In this case, at least 0.15 $\mu$l of perfluoropolyether having a structure expressed by any one of the structural formulas 1–5 is impregnated, in order to reduce the amount of contaminant adhered to a levitated plane of the magnetic head slider.

In order to reduce the amount of contaminant adhered to the levitated plane of the magnetic head slider and, further, to reduce decrease of the lubricant film thickness, at least 0.5 $\mu$-liter of perfluoropolyether having a structure expressed by any one of the structural formulas 1–5 is desirably impregnated. The amount of the lubricant impregnated into the filter does not have any particular limitation as far as the lubricant does not cause any trouble in operation of the device such as generating lubricant drops and the like, and the amount of the lubricant is decided in consideration of the recovery effect of the lubricant film.

If the lubricant film formed on the magnetic disk contains at least one of perfluoropolyether having structures expressed by the structural formulas 1–5, the lubricant supplied from the lubricant supplying means is readily adhered onto the lubricant film formed on the magnetic disk surface, and a high recovery effect of the lubricant film is realized.

As for an operation system of the magnetic disk drive comprising a lubricant supplying means, the conventional CSS (Contact Start Stop) system has an effect to prevent head crash and others. However, the L/UL system; in which the magnetic head slider is positioned above the magnetic disk plane only when the magnetic disk is rotating, and the magnetic head slider is escaped to an outer region from the outer peripheral plane of the magnetic disk when the rotation of the magnetic disk is stopped; is advantageous because any problems such as adsorption (stiction) and the like will not be generated.

As explained above, sliding durability between the magnetic disk and the magnetic head slider can be ensured by supplying the lubricant from a lubricant supplying means. Furthermore, the lubricant can be supplied stably, and any significant design change of the device and increase in number of the components are unnecessary.

BRIEF DESCRIPTION OF THE DRAWINGS

These and other objects, features and advantages of the present invention will be understood more clearly from the following detailed description with reference to the accompanying drawings, wherein.

Figure 1:
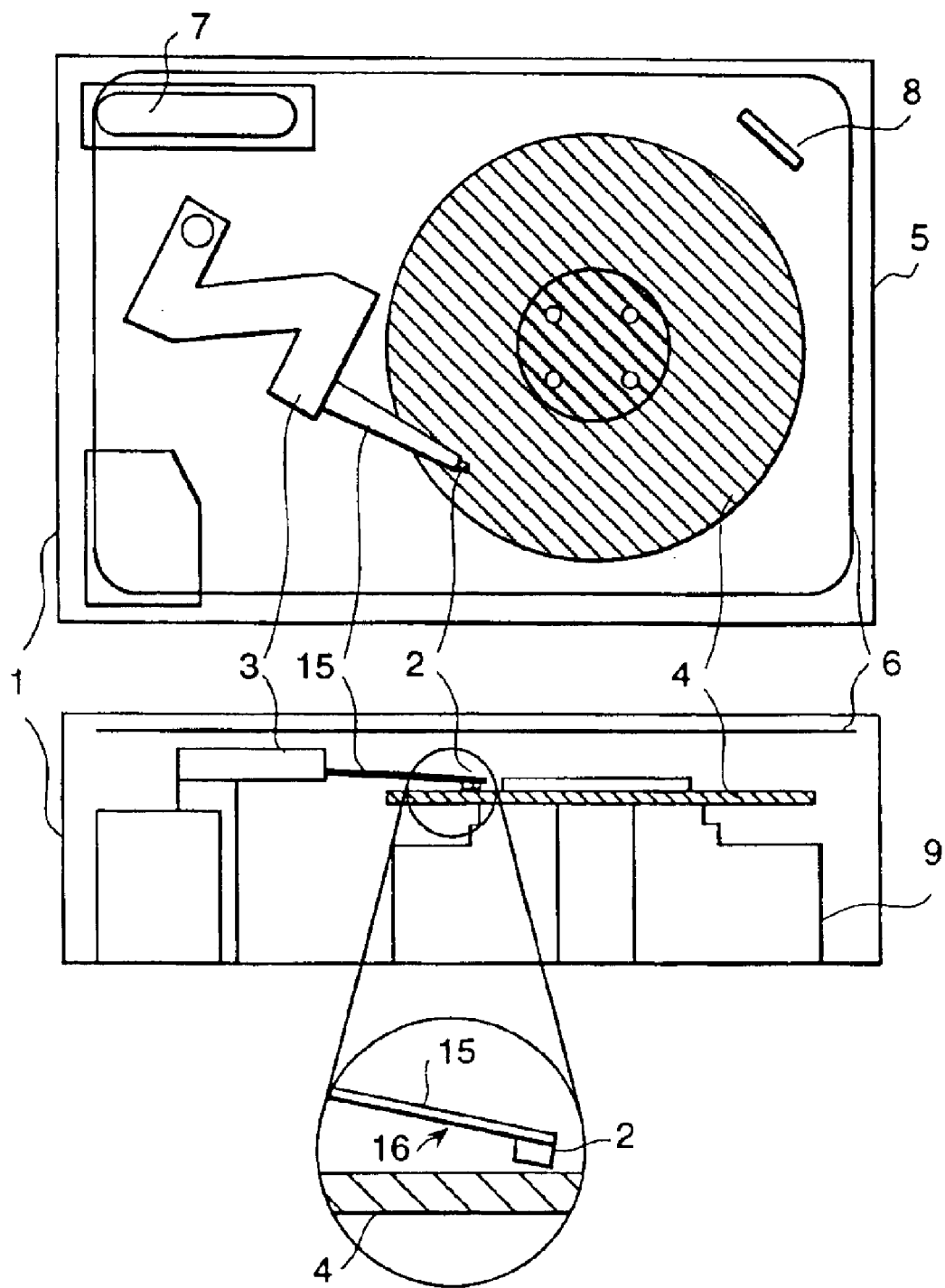
FIG. 1 is a schematic plan view and a schematic side view of the testing apparatus used in the embodiment 1.
Figure 2:
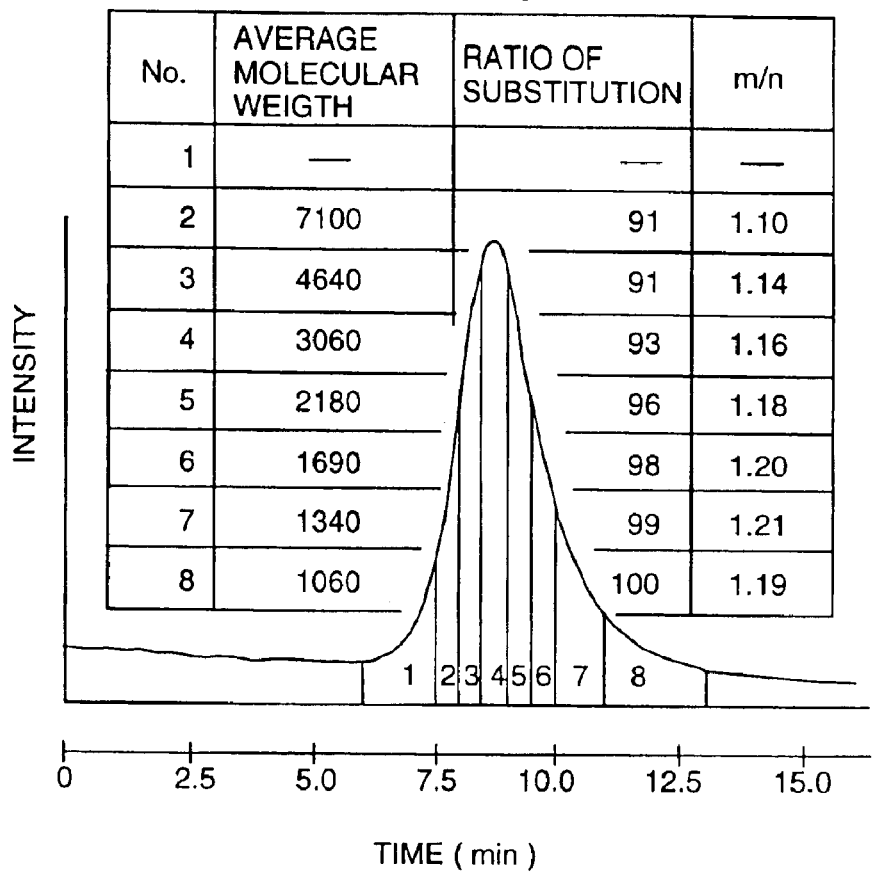
FIG. 2 is graph indicating a result of fractionation of perfluoropolyether into eight regions depending on their molecular weights.

DETAILED DESCRIPTION OF THE PREFERRED EMBODIMENTS (1) A Supply Source of the Lubricant In order to supply the lubricant by heat in the magnetic disk drive and air flow generated by rotation of the disk in the present invention, a supply source of the lubricant was provided in the magnetic disk drive as follows:

① The lubricant is applied onto surface of a suspension, and/or an arm. Or

② The lubricant is impregnated in a lubricant holding means (filter, wick material, and the like), and the lubricant holding means is provided in the magnetic disk drive.

When the disk is rotated and the temperature in the disk device is rised, the lubricant is evaporated from the supply source and supplied to surface of the disk. The filter impregnated with the lubricant was arranged so that the air flow in the device could be utilized effectively.

(2) Composition of the Lubricant

In accordance with the present invention, perfluoropolyether is used as the lubricant for supply. In order to achieve a stable supply and a sufficient recovery function against scraped-off by the head, perfluoropolyether having an adsorptive polar group is used. And, the molecular weight of the perfluoropolyether is specified as a value sufficient for evaporation by the temperature and supply by the air flow in the magnetic disk drive. Practically, perfluoropolyether are as follows:

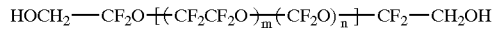

(Structural formula 1)

$HOCH_2-CF_2O-\!\!+\!\!(CF_2CF_2O)_m\!\!-\!\!(CF_2O)_n\!\!+\!\!-CF_2-CH_2OH$ (Structural formula 2)

$HO-\!\!+\!\!CH_2CH_2O\!\!+\!\!_s\!\!-CH_2CF_2O-\!\!+\!\!(CF_2CF_2O)_m\!\!+\!\!(CF_2O)_n\!\!+\!\!$ $-CF_2CH_2-\!\!+\!\!OCH_2CH_2\!\!+\!\!_s\!\!-OH$ (Structural formula 3)

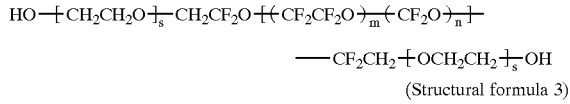

(Structural formula 4)

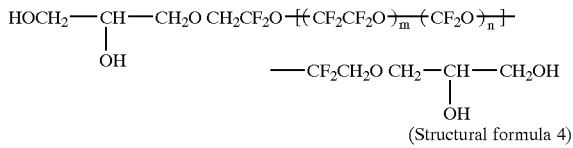

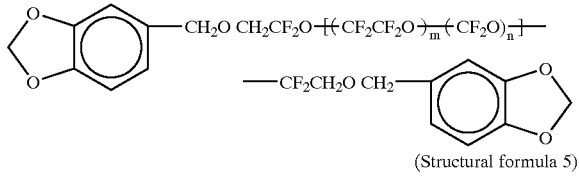

(Structural formula 5)

$CH_3-OOC-CF_2O-\!\!+\!\!(CF_2CF_2O)_m\!\!-\!\!(CF_2O)_n\!\!+\!\!-CF_2-COO-CH_3$ (where, n, m, s are positive integer).

These lubricants have polar groups at both terminal ends of perfluoropolyether chain, and a high recovery effect for the lubricant film, because these lubricant are readily adsorbed onto surface of the disk. The amount of the lubricant to be applied or impregnated was adjusted corresponding to the structure and volume of the casing of the magnetic disk drive.

(3) Composition of the Magnetic Disk of the Present invention

The magnetic disk is composed of a substrate, whereon a seed layer, a magnetic layer, a overcoat mainly made of carbon, and a lubricant layer made of perfluoropolyether as the outermost layer are formed sequentially. The lubricant film is composed of perfluoropolyether. Practically, the lubricant having at least a structure expressed by any one of the structural formulas 1–4 can be indicated as an example, but the present invention is not restricted to this example.

(4) Use of the Magnetic Disk Drive of the Present Invention

The magnetic disk drive of the present invention can be used as exterior memories (practically hard disk devices and the like) in electronic computers, word processors, and the like. Furthermore, the magnetic disk drive can be applied to mobile computers, navigation systems, games, and various information devices such as portable telephones, PHS, and the like.

Hereinafter, the present invention is explained in detail referring to the embodiments.

(Embodiment 1)

An effect of supplying the lubricant was verified in the present embodiment by measuring variation in lubricant film thickness of a case when a lubricant supplying source was provided on the suspension 15 and in a case when such a lubricant supplying source was not provided.

The testing apparatus 1 used in the present embodiment 1 is indicated in FIG. 1. The testing apparatus is composed based on a practical magnetic disk drive, and an evaluation under an operational condition as same as a practical device is possible. The magnetic head slider 2 is provided at the tip of the suspension 15, and the suspension 15 is supported by the arm 3. A distortion gauge is provided inside the arm portion 3, and a friction force between head and disk can be measured. The spindle portion and the voice coil motor portion are improved so that the disk rotation number and the seek frequency are made variable. In order to control the temperature inside the apparatus, a cord heater 6 is attached to the cover 5 of the apparatus, and the temperature is made variable from room temperature to 80° C. The bar heater 7 and the filter 8, which make it possible to hold the lubricant and heat it, are provided inside the apparatus. The inner volume of the apparatus is 450 ml. The magnetic disk 4 is made by forming a seed layer made of a Cr alloy, a magnetic layer made of CoCrTaPt, and a carbon overcoat, sequentially, on a glass substrate of 63.5 mm (2.5 inches) in diameter. Hardness of the carbon overcoat is enhanced by forming the film in an atmosphere of Ar/N$_2$ gas mixture, and the film thickness is 5 nm.

A magnetic disk 4 was prepared by forming a lubricant film of 2 nm thick made of perfluoropolyether (number average molecular weight 3000) having a structure expressed by the structure formula 1 on a carbon overcoat. The film thickness was measured by FT-IR.

Perfluoropolyether having a structure expressed by the structure formula 1 was molecular weight fractionated by HPLC (High Pressure Liquid Chromatography). Samples No 1 to No. 5 were prepared with the molecular weight-fractionated perfluoropolyether.

Sample No. 1: Molecular weight 1340

Sample No. 2: Molecular weight 2180

Sample No. 3: Molecular weight 3060
Sample No. 4: Molecular weight 4640
Sample No. 5: Molecular weight 7100

Each of these perfluoropolyether was dropped by 1.0 $\mu$-liter onto the suspension 15 plane facing to the magnetic disk 4 at a spot 16, which is 10 mm away from the magnetic head slider 2, and then, the suspension 15 was attached to the testing apparatus 1.

A plane having a radius in the range of 16 mm to 28 mm of the magnetic disk 4 was moved to random seek (a random seek test) under an environment of 65° C. Rotation number of the magnetic disk 4 is 5400 rpm. In accordance with the test in the present embodiment, the magnetic head slider 2 was slid on the magnetic disk 4 in a condition that it nearly comes to contact, and the magnetic head slider 2 was given a load of 37.5 mN, which was about 1.5 times of the ordinary load (25 mN) in order to make the test under an accelerated condition.

Figure 3:
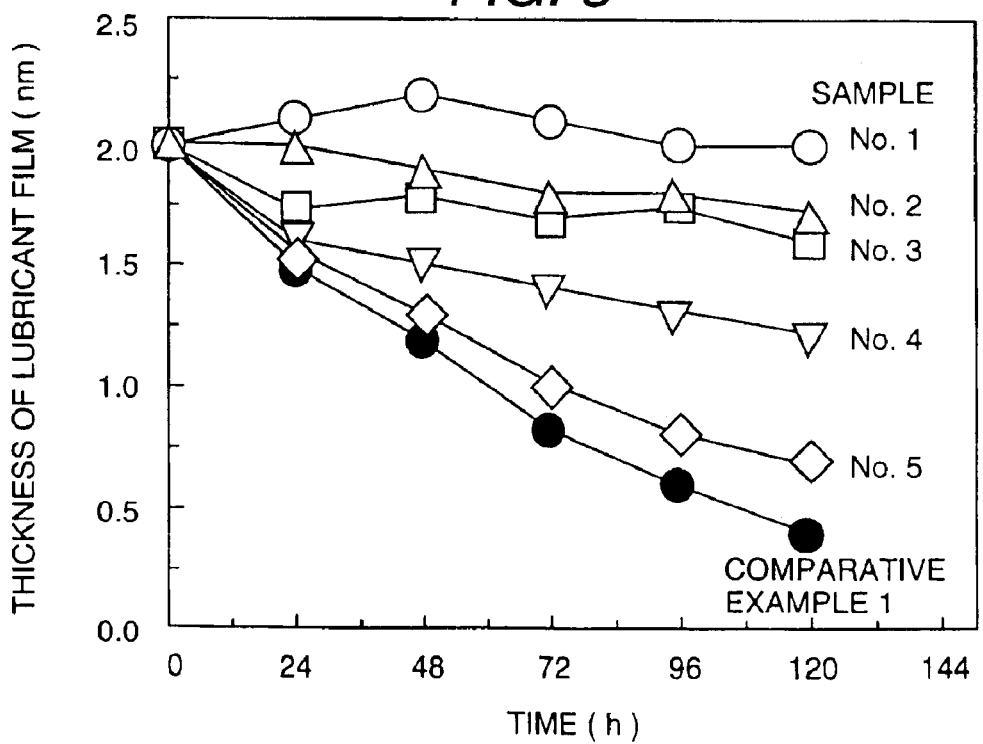
FIG. 3 is a graph indicating variation in lubricant film thickness versus time in the random seek test in the embodiment 1.

FIG. 3 indicates variation in lubricant film thickness on the magnetic disk 4 surface versus testing time. A case when perfluoropolyether was not dropped onto the suspension is indicated as comparative example 1.

The lubricant film thickness of the comparative example 1 was decreased to 0.3 nm after 120 hours of run. By contrast, when perfluoropolyether was dropped onto the suspension as the sample 1–5, the lubricant film thickness was decreased very slightly. Furthermore, this result indicates a tendency that the decrease of the lubricant film thickness becomes smaller as the molecular weight becomes smaller.

In accordance with the result on the comparative example 1, the lubricant film thickness was decreased with 0.3 nm/24 h in average when the lubricant was not supplied from outside the disk surface. In accordance with the result shown in FIG. 3, lubricant supplying rates in the embodiment 1 can be calculated as 0.34 nm/24 h when the molecular weight is 1340, 0.3 nm/24 h when the molecular weight is 2180, 0.26 nm/24 h when the molecular weight is 3060, 0.19 nm/24 h when the molecular weight is 4640, and 0.08 nm/24 h when the molecular weight 7100. In order to ensure the reliability of the device by maintaining a sufficient film thickness, the lubricant supplying rate must be maintained at least 0.2 nm/24 h. As explained above, decrease of the lubricant film thickness at the surface of the magnetic disk 4 can be reduced significantly by using perfluoropolyether having a molecular weight smaller than approximately 4000 as lubricant, because even if the lubricant is scraped off from the surface of the magnetic disk 4 by the magnetic head slider 2, the lubricant is supplied from the suspension 15 by heat and air flow.

In order to make a relationship between the molecular weight of the lubricant and the supplying rate clear, the lubricant fractionated in molecular weight by HPLC was used in the embodiment 1. However, in practical use in the device, use of commercial available lubricant is advantageous in cost. In accordance with the result on the comparative example 1, it was revealed that the lubricant film thickness was decreased by a rate of 0.3 nm/24 h in average when the lubricant was not supplied from outside. Therefore, it can be calculated from the supplying amount of the lubricant that even if the commercial available lubricant has a number average molecular weight larger than 4000, the decrease of the lubricant film thickness can be reduced if the lubricant contains a component having a number average molecular weight smaller than 4000 by at least 40% to total weight.

As explained above, if perfluoropolyether containing components having a molecular weight smaller than 4000 by at least 40% to total weight is used, the decrease of the lubricant film thickness can be reduced by stable supply of the lubricant onto the surface of the magnetic disk by heat and air flow.

Figure 4:
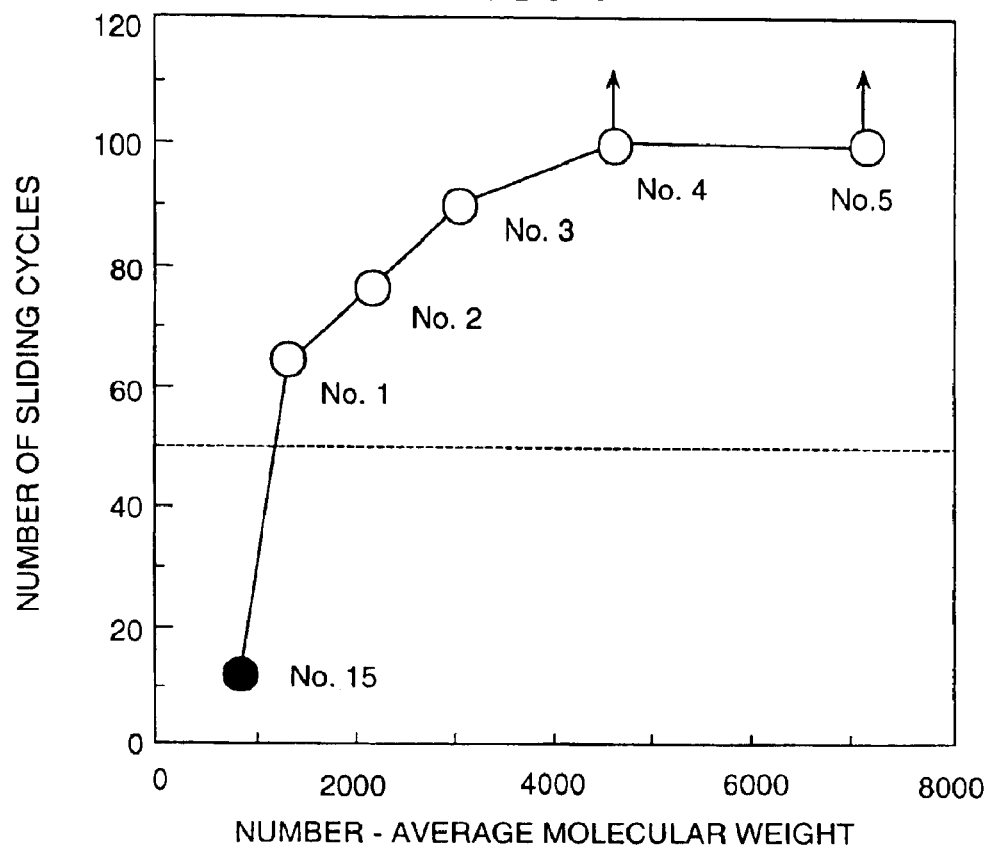
FIG. 4 is a graph indicating an experimental result evaluating a relationship between molecular weight of the lubricant versus sliding performance tested in the embodiment 1.

Next, a sliding durability was evaluated by sliding the magnetic disks 4, which were prepared by applying each of the samples 1–5 obtained previously by molecular weight fractionation by HPLC, on the magnetic head slider 2 under a complete contacting condition. The test was performed by sliding the magnetic disk 2 onto the magnetic head slider 2 continuously with complete contact in a condition of 150 rpm and load 11.76 mN, and the sliding durability was determined by the number of sliding until a disk crash occurred. The test was performed by 100,000 sliding at maximum, and put a target of the sliding durability for practical magnetic disk drive at least 50,000 sliding. The result of sliding durability test is indicated in FIG. 4. Here, the result was studied in comparison with the sample 15, which was prepared by applying perfluoropolyether having a molecular weight of 850 obtained by molecular weight fractionation of the same perfluoropolyether as the one used in the embodiment 1 by HPLC onto the magnetic disk 4 (sample 15). The sample 15 was disk-crashed at 7000 sliding, but all the other samples of the embodiment 1 indicated a sliding durability of more than 50000 sliding. From this observation, it can be concluded that the lubricant (perfluoropolyether) to be supplied desirably has a molecular weight of at least 1000, in order to endure the sufficient sliding durability. However, it must be retained that, even if the molecular weight is smaller than 1000, an advantageous effect to prevent decrease of the lubricant film thickness is not entirely denied as far as the result shown in FIG. 3 is considered and the molecular weight of the perfluoropolyether is sufficient to enable lubrication.

In accordance with the result explained above, decrease of the lubricant film thickness can be reduced by stable supply of the lubricant to the surface of the magnetic disk by heat and air flow, if perfluoropolyether containing components having a molecular weight smaller than 4000 by at least 40% to total weight is used. Furthermore, if the lubricant (perfluoropolyether) containing components having a molecular weight of at least 1000 and smaller than 4000 by at least 40% to total weight is used, the lubricant can be supplied stably to the surface of the magnetic disk by heat and air flow, and not only the reduction of decrease of the lubricant film thickness, but also superior sliding durability can be ensured.

(Embodiment 2)

In accordance with the embodiment 1, a supplying source of lubricant was provided on the suspension 15. In the embodiment 2, the lubricant was impregnated into a filter 8 and the filter was placed in the magnetic disk drive as a supplying source of the lubricant. The filter 8 used was shaped a sheet of 10 mm long×10 mm wide×2 mm thick. An example of location of the filter placement is shown in FIG. 1.

Figure 5:
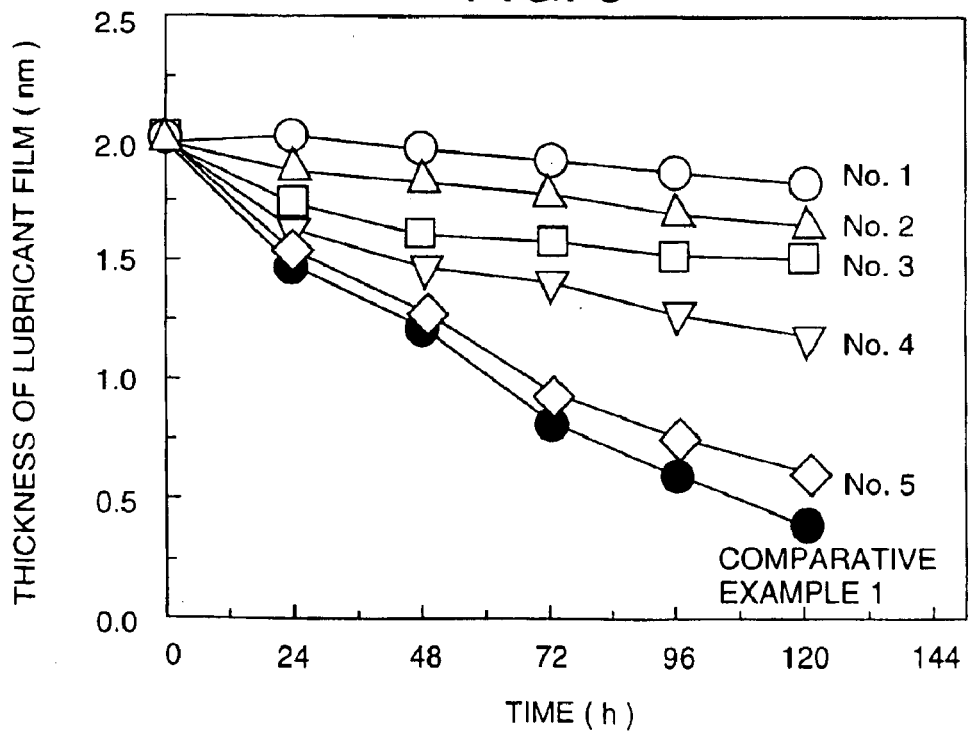
FIG. 5 is a graph indicating variation in lubricant film thickness versus time in the random seek test in the embodiment 2.

Each of perfluoropolyether of No. 1 to No. 5 was dissolved into a fluorine group solvent (HFE7100) by 40 wt %, the solution 20 $\mu$-liter was dropped into the filter 8 using a micropipette, and a random seek test was performed under the same condition as the embodiment 1. The test result is shown in FIG. 5. A case when perfluoropolyether was not used is indicated as the comparative example 1.

In comparison with the comparative example 1, the case, when the filter 8 impregnated with perfluoropolyether was provided, indicated smaller decrease of the lubricant film thickness, and superior sliding durability by supplying the lubricant. As same as the result of the embodiment 1, the lubricant film thickness is almost constant value if the molecular weight is smaller than 4000. Accordingly, decrease of the lubricant film thickness at the surface of the magnetic disk 4 can be reduced significantly by using perfluoropolyether containing components having a molecular weight smaller than 4000 by at least 40% to total weight because the lubricant is supplied from the filter 8 by heat and air flow.

(Embodiment 3)

In accordance with the embodiment 3, the filter 8, which was impregnated with each of perfluoropolyether of No. 6 to No. 11, was provided into the testing apparatus 1, and how much the lubricant could be supplied to the surface of the magnetic disk was studied. The samples were obtained by molecular weight fractionation of perfluoropolyether having the structural formula 1 for samples 6–8, the structural formula 2 for sample 9, the structural formula 3 for sample 10, the structural formula 5 for sample 11, and the structural formula 4 for sample 16. A solution was prepared by dissolving perfluoropolyether of samples 6–16 into a fluorine group solvent (HFE7100) by 40 wt %, and the solution 20 μ-liter was impregnated into the filter 8.

Sample No. 6: Molecular weight 2000
Sample No. 7: Molecular weight 4000
Sample No. 8: Molecular weight 6000
Sample No. 9: Molecular weight 2000
Sample No. 10: Molecular weight 2000
Sample No. 11: Molecular weight 2000
Sample No. 16: Molecular weight 2000

The magnetic disk 4 (no lubricant) which is not applied with the lubricant is rotated for 24 hours, and then, thickness of the lubricant film on the magnetic disk is measured. The number of rotation is 5400 rpm. The testing apparatus is not provided with the magnetic head slider 2 nor the arm portion 3. During the rotation, inside the testing apparatus 1 was heated to 65° C.

Figure 6:
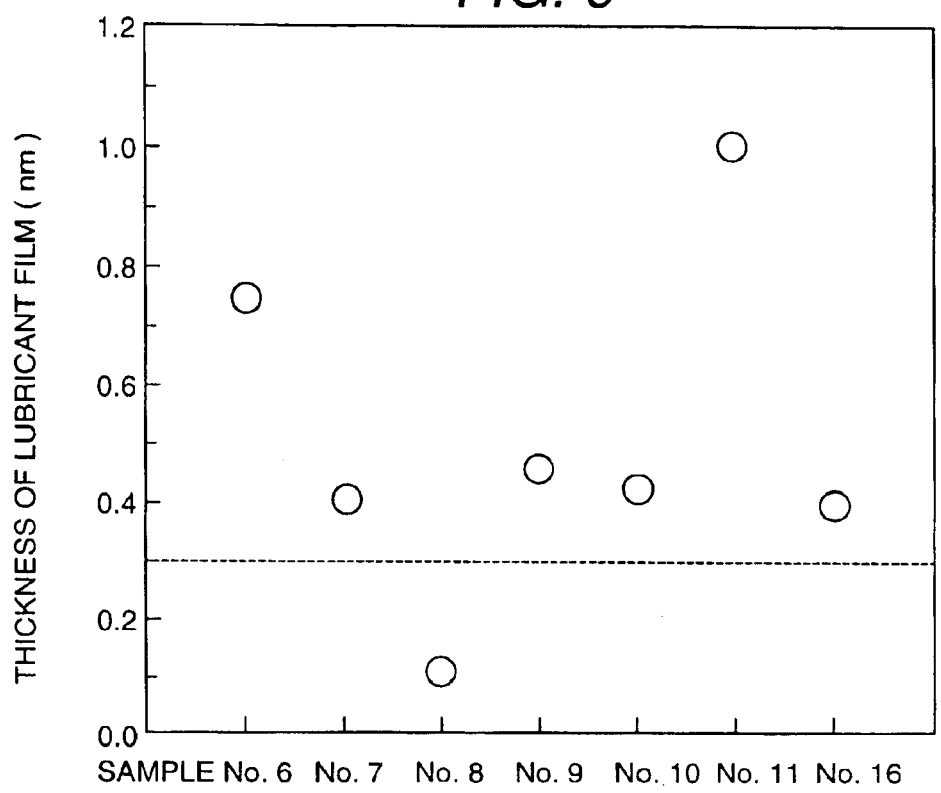
FIG. 6 is a graph indicating a relationship between molecular structures of the lubricant and supplying amounts of the lubricant in the embodiment 3.

The result is indicated in FIG. 6. In the evaluation of the embodiment 3, the lubricant's thickness of the samples 6, 7, 9, 10, 11, and 16 after 24 hours rotation are at least 0.3 nm. On the contrary, the lubricant's thickness of the samples 8 is smaller than 0.15 nm, and it is revealed that the lubricant supply is significantly small.

When the lubricant is not supplied from outside the disk surface (comparative example 1), decrease of the lubricant film thickness is 0.3 nm per 24 hours. Then, if any one of the lubricants of samples 6, 7, 9, 10, 11, and 16 is impregnated in the filter and used as the lubricant supply source, the lubricant can be supplied stably to the surface of the disk by heat and air flow.

(Embodiment 4)

Figure 7:
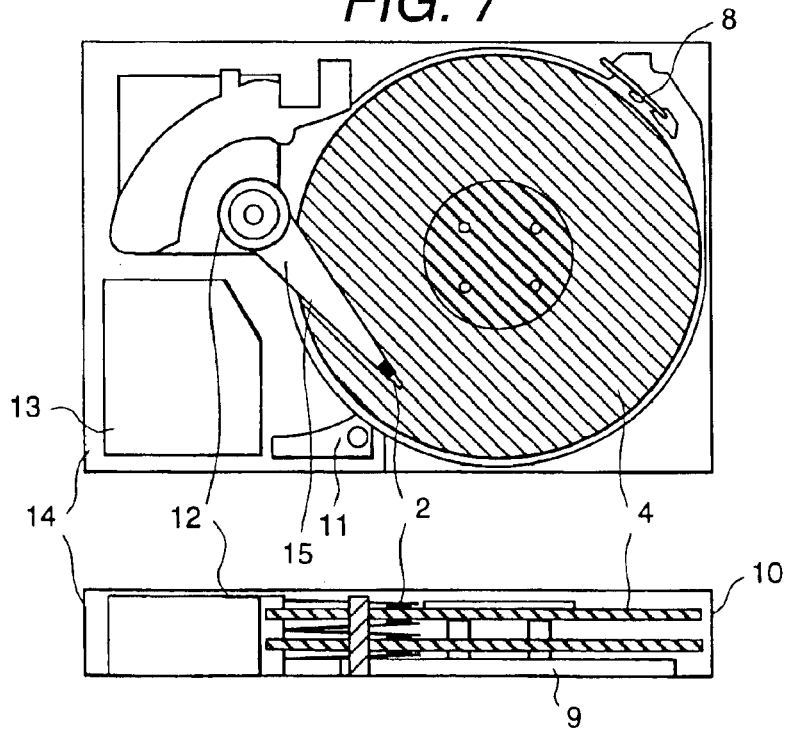
FIG. 7 is a schematic plan view and a schematic side view of the magnetic disk drive 14 used in the embodiment 4.

A schematic plan view and a schematic side view of the magnetic disk drive 14 are shown in FIG. 7. The magnetic disk drive 14 comprises a magnetic disk 4 of 63.5 mm (2.5 inches) in diameter, housing 10, spindle motor 9, actuator 12, magnetic head slider 2, suspension 15, and control circuit 13. On the surface of the magnetic disk 4, a lubricant made of perfluoropolyether having a structure expressed by the structural formula 1 and a number average molecular weight 3000 was applied with film thickness of 2 nm. The magnetic disk drive has a Load/Unload mechanism. The magnetic disk drive 14 is provided with two magnetic disks 4, and the volume of inside the device is 30.0 m-liter. Each of solutions which was prepared by dissolving each of the lubricant sample 6 (molecular weight 2000) and the lubricant having the structural formula 6 (molecular weight 4000) into a fluorine group solvent (HFE7100) by 40 wt % was impregnated into the filter 8 by 1.25 μ-liters:

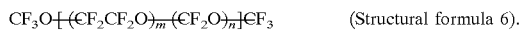

$$CF_3O\text{-}[(CF_2CF_2O)_m\text{-}(CF_2O)_n]\text{-}CF_3 \qquad \text{(Structural formula 6)}.$$

(where, n, m, s are positive integer).

The sample, in which the lubricant expressed by the structural formula 6 is impregnated into the filter, is designated as the comparative example 2. The magnetic disk drive 14 having a radius in the range of 16 mm to 28 mm of the magnetic disk 4 was moved to random seek (a random seek test) under an environment of 65° C. for 1000 hours. A case when the lubricant was not supplied was tested in the same way as the comparative example 3. The load of the magnetic head slider 2 is 25 mN, and rotation number of the magnetic disk 4 is 5400 rpm.

Figure 8:
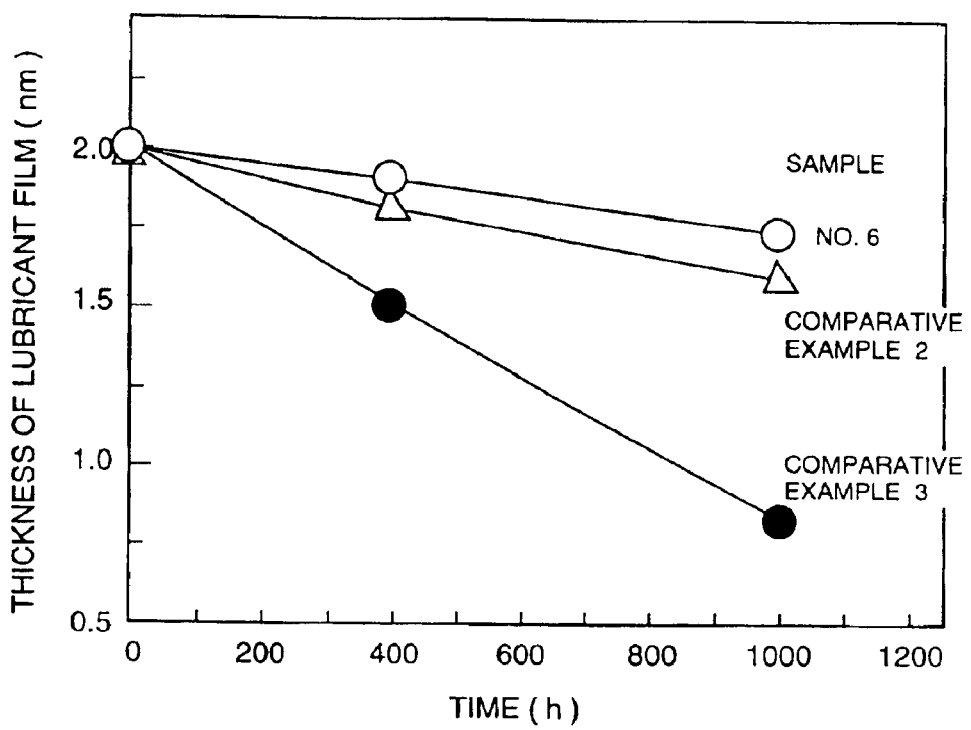
FIG. 8 is a graph indicating variation in lubricant film thickness versus device operable time in the embodiment 4.

FIG. 8 indicates variation in film thickness versus device operation time. The decreased in film thickness after 1000 hours operation is approximately 0.18 nm for the sample No. 6, and approximately 0.37 nm for the comparative example 2. In case of the comparative example 3 wherein the lubricant was not supplied, the decrease in film thickness after 1000 hours operation was approximately 1.2 nm. The decrease of the film thickness in cases of the sample 6 and the comparative example 2 are reduced significantly by supply of the lubricant. This is because the effect of controlling the molecular weight as explained previously. The result having the same tendency was obtained in case of providing three magnetic disks.

Figure 9:
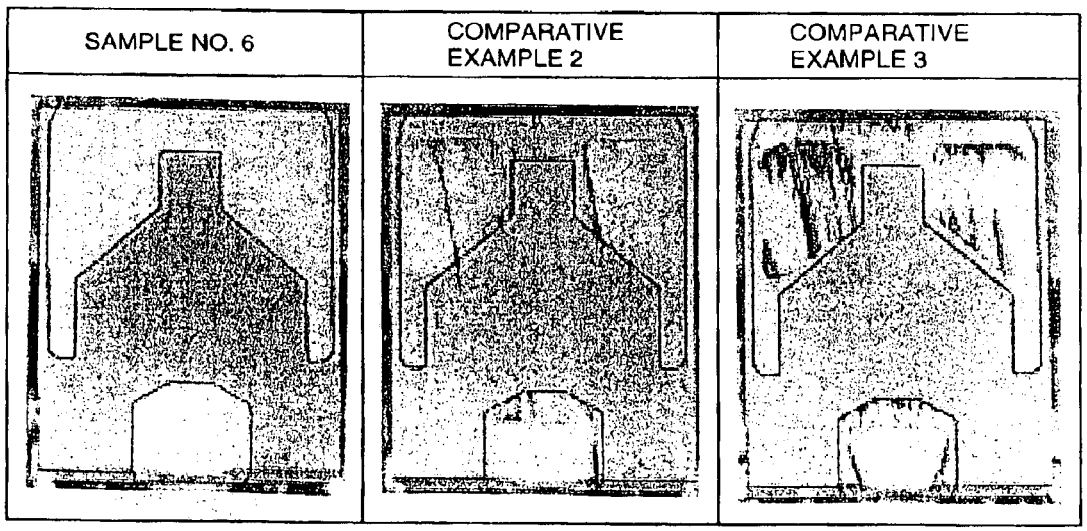
FIG. 9 is photographs taken from the levitated planes of the magnetic head slider 2 after 1000 hours in the device evaluation test (FIG. 8) in the embodiment 4.

Next, photographs of the levitated plane of the magnetic head slider 2 after 1000 hours of random seek test were taken. The result is indicated in FIG. 9.

It can be clearly observed that smears are adhered significantly on the levitated planes of the comparative examples 2 and 3 (no lubricant), but the smears are scarcely adhered in case of the sample 6. That means, the comparative example 3 has an advantage to supply lubricant (reduction of the film thickness decrease), but it has scarcely the effect to prevent adhesion of smears onto the levitated plane. Difference in structure of the sample 6 from the comparative example 2 is the presence of polar groups near the terminal end positions of the molecule. It can be understood that the molecule having the polar groups reacts significantly with the levitated plane, and accordingly, a stronger effect to prevent adhesion of smears than non-polar lubricants such as the comparative example 3 is realized.

As explained above, supply of the lubricant having polar organic groups in its molecule such as the sample 6 makes it possible to prevent the levitated plane of the magnetic head slider from adhering the smears.

(Embodiment 5)

In the embodiment 5, the lubricant having the structure expressed by the structural formula 7 was applied onto the surface of the magnetic disk 4 with the film thickness of 2 nm.

(Structural formula 7).

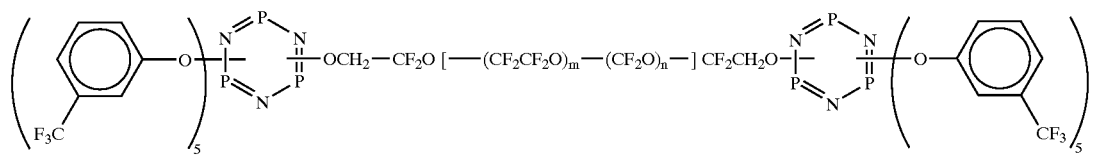

(where, n, m, s are positive integer).

Each of the lubricant (perfluoropolyether) of sample 6, 7, and 8 was dropped by 1.0 µ-liter onto the plane, which faces to the magnetic disk 4, of the suspension supporting the magnetic head slider 2 at a spot 10 mm away from the magnetic head slider 2.

The magnetic head slider 2 was provided to the magnetic disk drive 14 described previously in the embodiment 4, and was moved to random seek (a random seek test) under the same condition as the embodiment 4 for 1000 hours. Then, variation in film thickness versus device operation time was measured. Furthermore, smears which adhered onto the sliding plane of the magnetic head slider 2 after the measure was finished (after 1000 hours) were observed by optical microscope.

Figure 10:
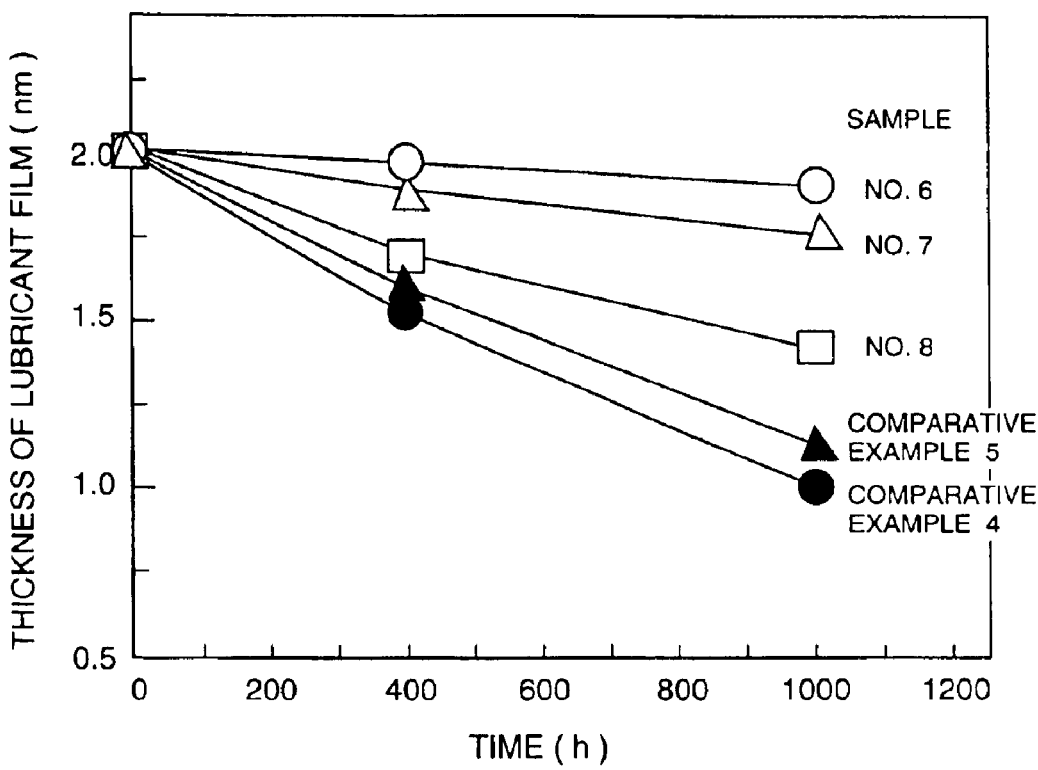
FIG. 10 is a graph indicating variation in lubricant film thickness versus device operation time in the embodiment 5, and the comparative examples 4 and 5.

FIG. 10 indicates variation in lubricant film thickness versus device operation time. The comparative example 4 is the case when the same test as the embodiment 5 is performed without dropping the lubricant onto the suspension (no supply of the lubricant) using the same magnetic disk drive 14 as the embodiment 5. Furthermore, a case when the lubricant having the same molecular structure as the embodiment 5, but its molecular weight is 850, is dropped onto the suspension is taken as the comparative example 5. In accordance with the comparative example 4, decrease of the film thickness after 1000 hours was approximately 1.1 nm. With the comparative example 5, decrease of the film thickness after 1000 hours was approximately 0.9 nm. This fact in accordance with the test using the magnetic disk drive so far can be understood that the molecular weight of the lubricant in the comparative example 5 is smaller than 4000, and even if it may have the effect to reduce decrease of film thickness, the lubricant which scraped off by the magnetic head slider 2 is larger than the amount of the lubricant supplied to the surface of the disk, because of low sliding durability. In accordance with the sample 8, although the decrease of lubricant film thickness after 1000 hours is smaller than the comparative example 4, the decreased amount of the lubricant film thickness is more than two times in comparison with the samples No. 6 and 7, and the effect of supplying the lubricant is small. On the contrary, the decrease of the lubricant film thickness of the samples No. 6 and 7 after 1000 hours is smaller than 0.25 nm, and it can be said that the effect with the supply of the lubricant is significant and reliability as the magnetic disk drive is superior. In accordance with the comparative examples 4 and 5, smears were adhered onto the sliding plane of the magnetic head slider 2. On the contrary, no smears adhesion was observed on the sliding planes of the magnetic head slider 2 of the samples No. 6 and 7.

In accordance with the results explained above, if the lubricant (perfluoropolyether) has a molecular weight larger than 1000 and contains a component having a molecular weight smaller than 4000 by at least 40 wt %, the lubricant can be supplied stably, and the magnetic disk drive having a preferable sliding durability and a superior reliability to maintain a precise operability can be obtained.

(Embodiment 6)

In accordance with the embodiment 6, each of perfluoropolyether of samples NO. 6 to 8 and the comparative example 2 was dropped onto the suspension 15; a random seek test was performed in a manner as same as the embodiment 3; variation in lubricant film thickness versus device operation time was measured; and smears on the levitated plane of the magnetic head slider 2 after 1000 hours operation were observed with optical microscope.

The magnetic disk drive as same as the embodiment 4 shown in FIG. 7 was used. On the surface of the magnetic disk 4, a lubricant made of perfluoropolyether having a structure expressed by the structural formula 1 and a number average molecular weight 3000 was applied with film thickness of 2 nm. As a lubricant supply source other than the surface of the magnetic disk, each of perfluoropolyether of the samples No. 6 to 8 and the comparative example 2 used in the embodiment 3 was dropped by 1.0 µ-liter onto the suspension 15 plane facing to the magnetic disk 4 at a spot 10 mm away from the magnetic head slider 2. The case when perfluoropolyether of the comparative example 2 was dropped was designated as the comparative example 6.

Figure 11:
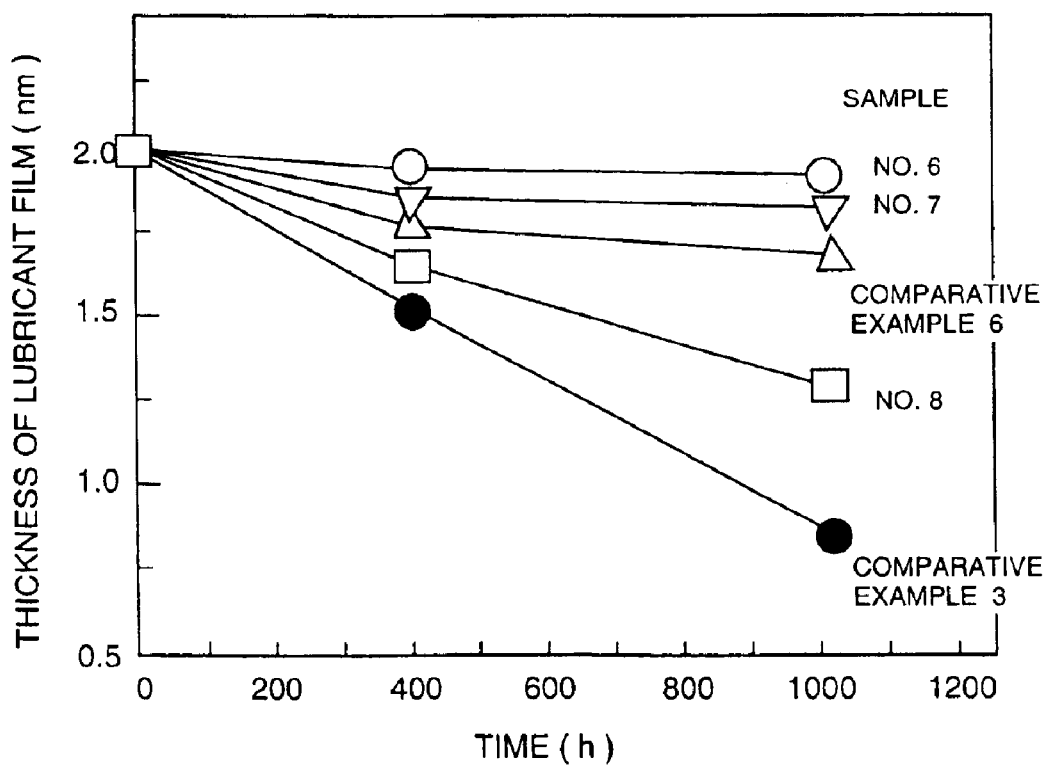
FIG. 11 is a graph indicating variation in lubricant film thickness versus device operation time in the embodiment 6, and the comparative example 6.

FIG. 11 indicates variation in lubricant film thickness versus device operation time. In case of the comparative example 3 wherein the lubricant was not supplied, the decrease in film thickness after 1000 hours operation was approximately 0.8 nm. In accordance with the sample 8, although the decrease of lubricant film thickness after 1000 hours is smaller than the comparative example 3, the decreased amount of the lubricant film thickness is more than two times in comparison with the samples No. 6 and 7, and the effect of supplying the lubricant is small. On the contrary, the decrease of the lubricant film thickness of the samples No. 6 and 7 after 1000 hours is smaller than 0.3 nm, and it can be said that the effect with the supply of the lubricant is significant and reliability as the magnetic disk drive is superior.

In cases of the comparative examples of 3 and 6, smears were adhered onto the levitated plane of the magnetic head slider 2, but such adhesion of smears onto the levitated plan of the magnetic head slider 2 was not observed in cases of the samples 6, 7, and 8.

In accordance with the results explained above, if perfluoropolyether containing a component having a molecular weight smaller than 4000, desirably larger than 1000 and smaller than 4000, by at least 40 wt % is used as a lubricant, decrease of the lubricant film thickness at the surface of the magnetic disk 4 can be reduced significantly, because the lubricant can be supplied from the filter 8 by heat and air flow.

Furthermore, if the lubricant (perfluoropolyether) having polar groups in its molecule is supplied, adhesion of smears onto the levitated plane of the magnetic head slider 2 can be prevented, and the magnetic disk drive having a superior reliability can be obtained.

(Embodiment 7)

The lubricant sample No. 6 was dropped respectively by 1.0 µ-liter onto the suspension 15 planes facing to the magnetic disk 4 at each of spots 8 mm (sample 12), 15 mm (sample 13), and 20 mm (sample 14) away from the head element of the magnetic head slider 2. These magnetic head sliders 2 were provided to the magnetic disk drive 14 and tests were performed under the same condition as the embodiment 4.

Figure 12:
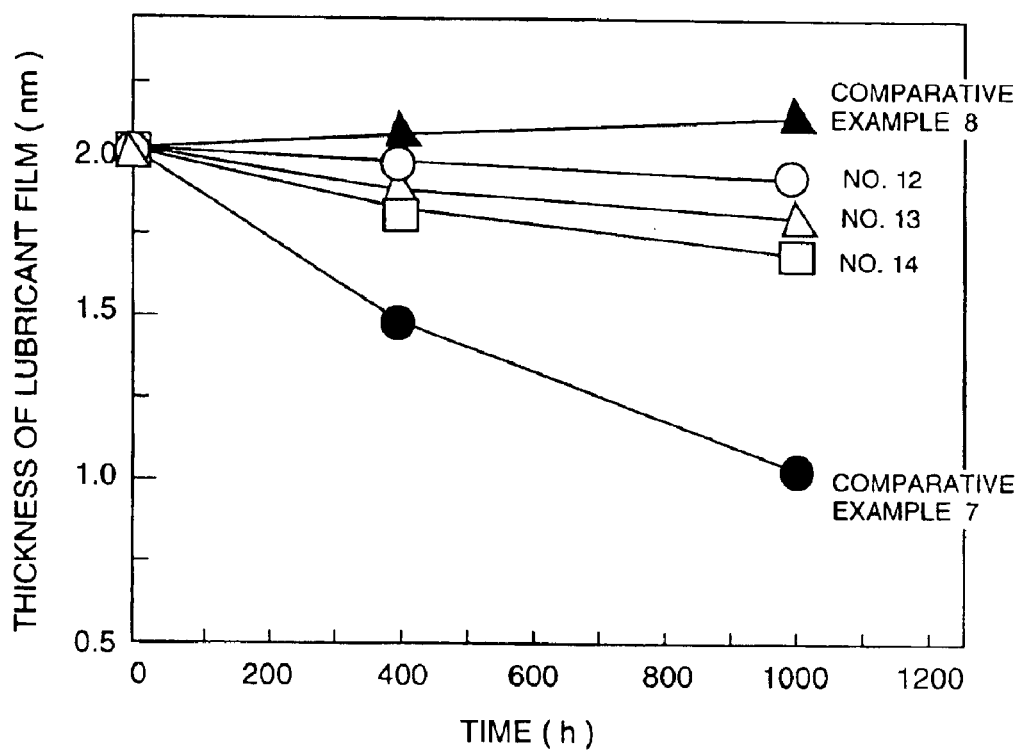
FIG. 12 is a graph indicating variation in lubricant film thickness versus device operation time in the embodiment 7, and the comparative examples 7 and 8.

FIG. 12 indicates variation in lubricant film thickness versus device operation time. In case of the comparative example 7, wherein the lubricant sample No. 6 is dropped at the spot 30 mm away from the head element of the magnetic head slider 2, the decrease of the lubricant film is significant, and the lubricant is not supplied sufficiently. On the contrary, the decrease of the lubricant film is small in the embodiment 7. In case of the comparative example 8, wherein the lubricant sample No. 6 is dropped at the spot 3.0 mm away from the head element of the magnetic head slider 2, the decrease of the lubricant film is scarcely observed. However, in the result of observation on the sliding plane of the magnetic head slider 2 after 1000 hours test operation, adhesion of smears onto the sliding plane of the magnetic head slider 2 at the head element side was observed. On the contrary, in cases of samples No. 12, 13, and 14, the adhesion of smears was scarce, and particularly, in cases of No. 12 and 13, the adhesion of strains was not observed at all. The adhesion of smears onto the sliding plane observed in the comparative example 8 is because the spot whereon the lubricant is dropped is too close to the head element and the lubricant is oozed to the head element portion. In case of the comparative example 7, wherein the lubricant No. 6 is dropped at the spot 30 mm away from the head element, the reason is assumed that the spot whereon the lubricant is dropped is too far from the element portion and a force of the air flow to supply the lubricant sufficiently is weak.

In accordance with the result explained above, the spot on the surface of the suspension, whereon the lubricant is dropped, is preferably in the range from 5.0 mm to 25 mm away from the head element.

(Embodiment 8)

Figure 13:
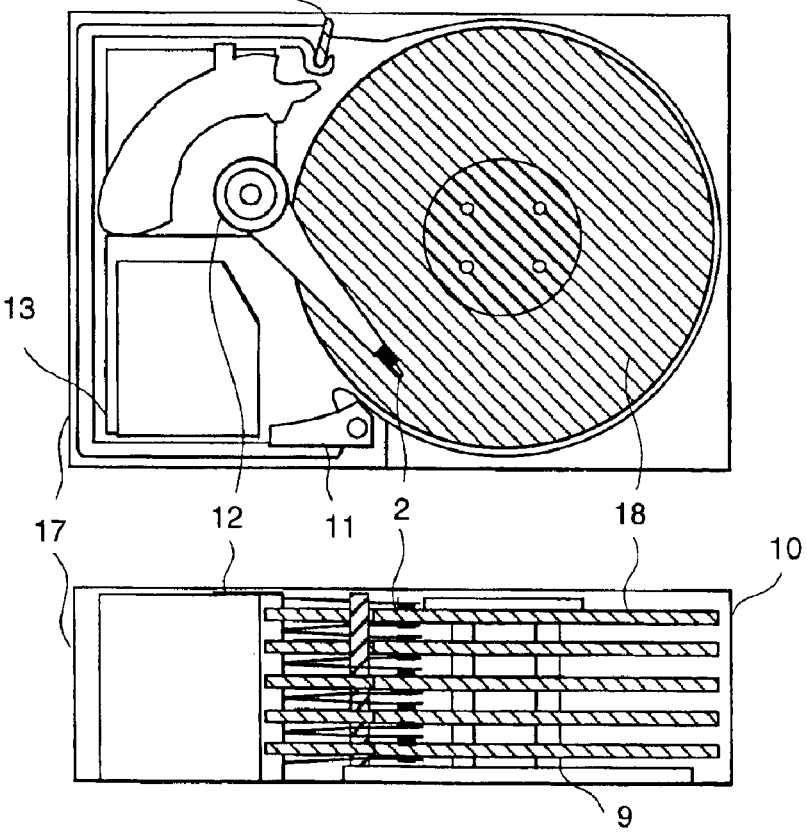
FIG. 13 is a schematic plan view and a schematic side view of the magnetic disk drive 17 used in the embodiment 8.

A schematic plan view and a schematic side view of the magnetic disk drive 17 used in the embodiment 8 are shown in FIG. 13. The magnetic disk drive 17 comprises a magnetic disk 18 of 76.2 mm (3.0 inches) in diameter, housing 10, spindle motor 9, actuator 12, magnetic head slider 2, and control circuit 13. The magnetic disk drive 17 is provided with a Load/Unload mechanism as same as the magnetic disk drive 14. The magnetic disk drive 17 is provided with five magnetic disk 18, and inner volume of the device is 120 m-liter. On the surface of the magnetic disk 18, a lubricant film made of perfluoropolyether (number average molecular weight 6000) having a structure expressed by the structural formula 1 was formed with film thickness of 2 nm. Each of solutions which was prepared by dissolving each of the lubricant sample No. 6 and the lubricant having the structure expressed by the structural formula 6 (molecular weight 4000) into a fluorine group solvent (HFE7100) by 40 wt % was impregnated into the filter 8 by 2.5 $\mu$-liters (contains perfluoropolyether 1.0 $\mu$-liters):

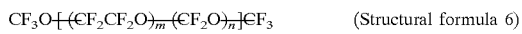

(Structural formula 6)

(where, n, m, s are positive integer).

The sample, in which the lubricant expressed by the structural formula 6 is impregnated into the filter, is designated as the comparative example 9. These filters 8 were provided to the magnetic disk drive 17, and a random seek test were performed with disk rotation of 10000 rpm for 1000 hours. A case when the lubricant was not supplied was tested in the same way as the comparative example 10.

Figure 14:
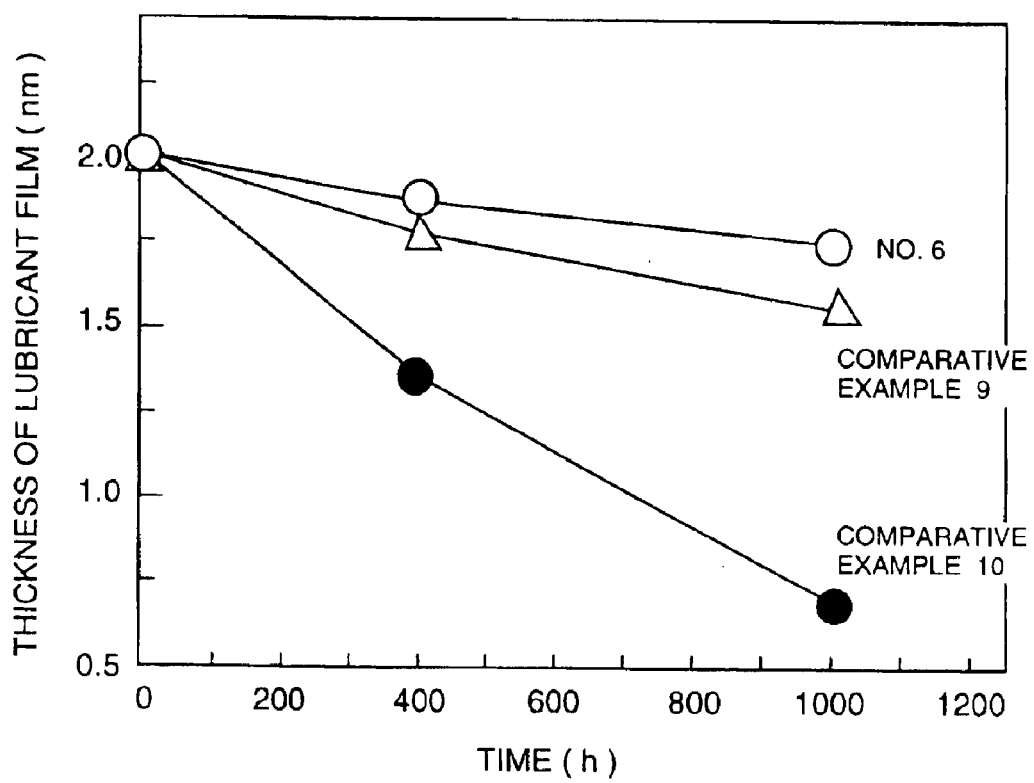
FIG. 14 is a graph indicating variation in lubricant film thickness versus device operation time in the embodiment 8, and the comparative example 9.

FIG. 14 indicates variation in lubricant film thickness versus device operation time. The decrease of the film thickness after 1000 hours were approximately 0.22 nm for the sample No. 6, and approximately 0.46 nm for the comparative example 9. On the contrary, in case of the comparative example 10 wherein the lubricant was not supplied, the decrease in film thickness after 1000 hours operation was approximately 1.35 nm. The decrease of the film thickness in cases of the sample 6 and the comparative example 9 are reduced significantly by supply of the lubricant. In the result of observation on the sliding plane of the magnetic head slider 2 after 1000 hours test operation, adhesion of smears onto the sliding plane of the magnetic head slider 2 was observed in cases of the comparative examples 9 and 10 (no supply of the lubricant) as same as the result shown in FIG. 9. On the contrary, in case of sample No. 6, the adhesion of smears was not observed at all.

In accordance with the result explained above, the reducing effect on decrease of lubricant film thickness with the magnetic disk drive corresponding to 3.0 inches disk can be realized by supplying the lubricant (perfluoropolyether). Furthermore, if the lubricant (perfluoropolyether) having polar groups in its molecule such as the sample No. 6 is supplied, adhesion of smears onto the levitated plane of the magnetic head slider 2 can be prevented, and the magnetic disk drive having a superior reliability can be obtained.

(Embodiment 9)

In accordance with the embodiment 9, variation in lubricant film thickness versus device operation time was measured in cases when the amount of sample No. 6 (perfluoropolyether) dropping into the filter 8 was changed. And smears adhered onto the levitated plane of the magnetic head slider 2 after 1000 hours operation were compared.

The apparatus used in the test was the same apparatus shown in FIG. 7 as the embodiment 4, and random seek tests were performed.

On the surface of the magnetic disk 4, a lubricant made of perfluoropolyether (number average molecular weight 3000) having a structure expressed by the structural formula 1 was applied to form film thickness of 2 nm. The amount of perfluoropolyether in the sample No. 6 dropped into the filter 8 is as follows:

0.1 $\mu$-liter (containing perfluoropolyether 0.04 $\mu$-liter)
0.25 $\mu$-liter (containing perfluoropolyether 0.1 $\mu$-liter)
0.375 $\mu$-liter (containing perfluoropolyether 0.15 $\mu$-liter)
0.7 $\mu$-liter (containing perfluoropolyether 0.28 $\mu$-liter)
1.25 $\mu$-liter (containing perfluoropolyether 0.5 $\mu$-liter)
2.5 $\mu$-liter (containing perfluoropolyether 1.0 $\mu$-liter)

Figure 15:
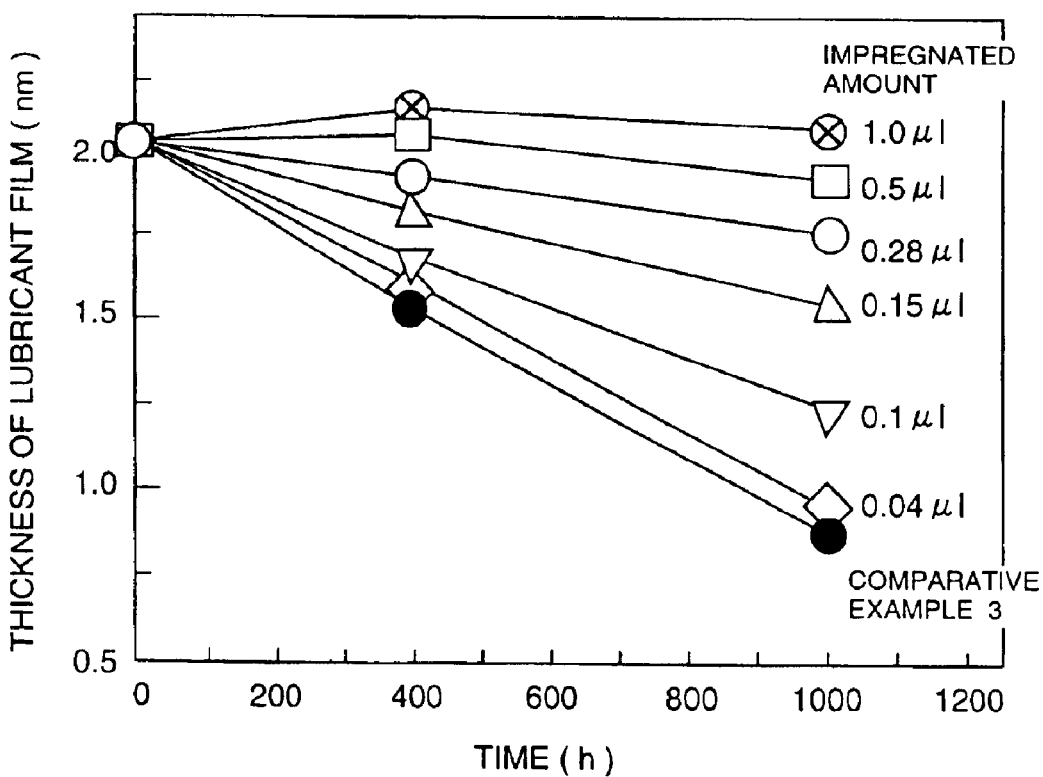
FIG. 15 is a graph indicating variation in lubricant film thickness versus device operation time in the embodiment 9, and the comparative example 3.

FIG. 15 indicates variation in lubricant film thickness versus device operation time. In case of the comparative example 3 wherein the lubricant was not supplied, the film thickness was decreased to approximately 0.7 nm after 1000 hours operation. On the contrary, if perfluoropolyether is contained at least 0.15 $\mu$-liter, the decrease of the film thickness can be reduced. Furthermore, if perfluoropolyether is contained at least 0.5 $\mu$-liter, the decrease of the film thickness can be reduced to smaller than 0.3 nm, that is, the decrease of the film thickness can be reduced significantly. It is useful to adjust the amount of the lubricant impregnated into the filter depending on the inner volume of the device, and the number of the magnetic disks provided in the device. In this case, it is also useful to consider the air flow depending on the structure of the device, and others.

Figure 16:
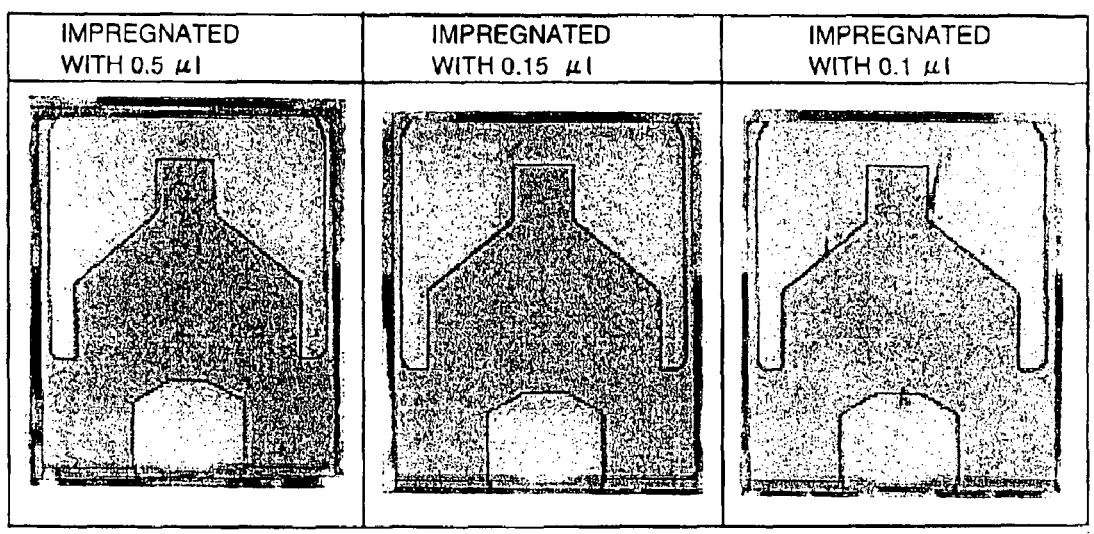
FIG. 16 is photographs taken from the levitated planes of the magnetic head slider 2 after 1000 hours in the device evaluation test (FIG. 15) in the embodiment 9.

A result of observation on the adhesion of smears onto the levitated plane of the magnetic head slider 2 is shown in FIG. 16.

As shown in FIG. 9 previously, a large amount of smears was adhered onto the levitated plane of the magnetic head slider 2 of the comparative example 3 (no supply of the lubricant). In the case containing perfluoropolyether by 0.1 $\mu$-liter, slight adhesion of smears onto the levitated plane of the magnetic head slider 2 was confirmed, even though the amount of the smears is less than the case of the comparative example 3 (no supply of the lubricant). On the contrary, no adhesion of smears were observed with the cases containing perfluoropolyether by 0.15 $\mu$-liter and 0.5 $\mu$-liter.

In accordance with the result explained above, although there may be some fluctuation in number on account of influence by small gas or dust generated from various members in the device, if the amount of perfluoropolyether of the sample 6, which is dropped into the filter 8, is equal to or more than 0.15 $\mu$-liter, adhesion of smears onto the levitated plane of the magnetic head slider 2 can be prevented, and furthermore, if more than 0.5 $\mu$-liter, an advantage to reduce the decrease of the lubricant film thickness significantly can be obtained.

(Embodiment 10)

In accordance with the embodiment 10, an effect of supplying lubricant to the operation system of the magnetic disk drive was verified.

In the embodiment 10, a magnetic disk prepared by forming a seed layer made of NiP film and Cr film, a magnetic layer made of CoCrTaPt, and a carbon overcoat sequentially onto surface of an aluminum substrate was used. Bump shaped protrusion was formed on the surface of the NiP film at a radius position in the range of 10 mm to 20 mm by laser. Accordingly, the bump shaped protrusion was also formed in a belt shape (laser zone) on the surface of the carbon overcoat at the same position as the NiP film. Normally, the magnetic disk of this type is used for CSS (Contact Start Stop) system magnetic disk drive. On the surface of the carbon overcoat, a lubricant film made of perfluoropolyether (molecular weight 3000) having the structure expressed by the structural formula 1 was formed by 2 nm thick.

The magnetic disk explained above was provided to the test apparatus shown in FIG. 1, and random seek test was performed as same as the embodiment 2 for 120 hours. The seek was performed on a flat plane other than the laser zone. A solution prepared by dissolving perfluoropolyether of sample 2 into a fluorine group solvent (HFE7100) by 40 wt % was dropped by 20 $\mu$-liter into the filter 8 with a micro-pipette. After random seek test for 120 hours, rotation of the magnetic disk was stopped. Simultaneously, the magnetic head slider 2 was saved onto the laser zone, and left it under a contacting condition for 24 hours. After 24 hours left, the magnetic disk was rotated again, and a stiction generated at the re-start of rotation and the lubricant film thickness on the surface of the magnetic disk after 120 hours' seek were measured.

In accordance with the measurement of the lubricant film thickness, the decrease of the film thickness from the initial film thickness was approximately 0.6 nm, and almost same result with the sample No. 2 of the embodiment 2 was obtained. Then, it was revealed that the decrease of the lubricant film thickness can be reduced significantly by supplying the lubricant. However, the stiction became significantly high value such as 7.8 gf. That is, if lubricant is supplied in the CSS system, an adsorption between the magnetic disk and the magnetic head slider is readily generated. Therefore, in order to reduce the decrease of the lubricant film thickness by supplying the lubricant with the CSS system, a countermeasure for preventing the adsorption such as forming protrusion on the levitated plane of the magnetic head slider, and the like becomes necessary. On the contrary, in case of the load/unload system, wherein the magnetic head slider is necessarily saved to outside from the outer peripheral plane of the magnetic disk whenever rotation of the magnetic disk is stopped, it is not necessary to consider the adsorption between the magnetic disk and the magnetic head slider, and it can be said advantageous in view of supplying the lubricant.

In accordance with each of the embodiments explained above, the filter 8 impregnated with the lubricant was used as the lubricant supply source. However, the lubricant can be impregnated into any members which can hold the lubricant without causing dropping and the lubricant is readily moved by temperature and air flow in the magnetic disk drive. For instance, gas adsorption filter, wick material, unwoven cloth, paper, and the like are usable. The same advantages can be obtained by adjusting the amount of the lubricant to be applied to the suspension or to be impregnated corresponding to the volume of the device. For instance, the present invention can be applied to the small size magnetic disk drives provided with small size magnetic disk such as the magnetic disks of 45.72 mm(1.8 inches) in diameter, 33.02 mm (1.3 inches), 25.4 mm (1 inch), and others.

In accordance with the present invention, the magnetic disk drive having a small decrease in lubricant film thickness on the surface of the magnetic disk and a superior sliding reliability between the magnetic head and the magnetic disk surface can be obtained.

What is claimed is:

1. A magnetic disk drive comprising:

a magnetic disk;

a spindle motor for rotating said magnetic disk;

a magnetic head slider for recording or reproducing data onto or from said magnetic disk;

a housing;

a control circuit system for controlling said head slider so that said head slider is positioned on a magnetic disk plane when said magnetic disk is rotating, and said head slider is saved to outside the magnetic disk plane when rotation of said magnetic disk is stopped; and lubricant supply means for supplying lubricant to the surface of said magnetic disk;

wherein said lubricant supply means contains at least a perfluoropolyether compound having any one of an alcohol group, a cyclic ether group, and an alkyl-ester group at its terminal position as a lubricant, and said lubricant contains said perfluoropolyether compound having a molecular weight sufficient to enable lubrication and no greater than 4000, and wherein said lubricant supply means is at least one of a suspension applied with said lubricant and an arm applied with said lubricant.

2. A magnetic disk drive comprising:

a magnetic disk;

a spindle motor for rotating said magnetic disk;

a magnetic head slider for recording or reproducing data onto or from said magnetic disk;

a housing;

a control circuit system for controlling said head slider so that said head slider is positioned on a magnetic disk plane when said magnetic disk is rotating, and said head slider is saved to outside the magnetic disk plane when rotation of said magnetic disk is stopped; and lubricant supply means for supplying lubricant to the surface of said magnetic disk wherein said lubricant supply means contains at least a perfluoropolyether compound having any one of an alcohol group, a cyclic ether group, and an alkyl-ester group at its terminal position as a lubricant, said lubricant containing said perfluoropolyether compound having a molecular weight sufficient to enable lubrication and no greater than 4000, wherein said lubricant supply means includes lubricant holding means for holding said lubricant, and wherein said lubricant holding means is a filter impregnated with said perfluoropolyether compound by at least 0.5 $\mu$-liter.

3. A magnetic disk drive comprising:

a magnetic disk;

a spindle motor for rotating said magnetic disk;

a magnetic head slider for recording or reproducing data onto or from said magnetic disk;

a housing;

a control circuit system for controlling said head slider so that said head slider is positioned on a magnetic disk plane when said magnetic disk is rotating, and said head slider is saved to outside the magnetic disk plane when rotation of said magnetic disk is stopped; and lubricant supply means for supplying lubricant to the surface of said magnetic disk;

wherein said lubricant supply means contains at least a perfluoropolyether compound having any one of an alcohol group, a cyclic ether group, and an alkyl-ester group at its terminal position as a lubricant, said lubricant containing said perfluoropolyether compound having a molecular weight sufficient to enable lubrication and no greater than 4000, wherein said lubricant supply means includes lubricant holding means for holding said lubricant, and wherein said lubricant holding means is a filter impregnated with said perfluoropolyether compound having any one of an alcohol group, a cyclic ether group, and an alkyl-ester group at its terminal position by at least 0.15 $\mu$-liter, characterized in having scarce smears on a levitated plane of said magnetic head slider.

* * * * *